United States Patent
Touma et al.

(10) Patent No.: US 8,325,138 B2
(45) Date of Patent: *Dec. 4, 2012

(54) WIRELESS HAND-HELD ELECTRONIC DEVICE FOR MANIPULATING AN OBJECT ON A DISPLAY

(76) Inventors: Pierre Touma, Austin, TX (US); Hadi Murr, Beirut (LB); Elias Bachaalany, Beirut (LB); Imad Maalouf, Beirut (LB)

( * ) Notice: Subject to any disclaimer, the term of this patent is extended or adjusted under 35 U.S.C. 154(b) by 279 days.

This patent is subject to a terminal disclaimer.

(21) Appl. No.: 12/590,897

(22) Filed: Nov. 16, 2009

(65) Prior Publication Data

US 2011/0109545 A1    May 12, 2011

Related U.S. Application Data

(63) Continuation of application No. 11/263,710, filed on Oct. 31, 2005, now Pat. No. 7,683,883.

(60) Provisional application No. 60/624,335, filed on Nov. 2, 2004.

(51) Int. Cl.
*G06F 3/033* (2006.01)
*G09G 5/08* (2006.01)

(52) U.S. Cl. ........................ 345/163; 345/157

(58) Field of Classification Search .......... 345/156–158, 345/163, 179, 684; 340/315, 407.01, 407.02, 340/571; 702/56, 150; 356/139.03
See application file for complete search history.

(56) References Cited

U.S. PATENT DOCUMENTS

| | | | |
|---|---|---|---|
| 4,787,051 A | 11/1988 | Olson | |
| 4,839,838 A | 6/1989 | LaBiche et al. | |
| 5,181,181 A * | 1/1993 | Glynn | 702/141 |
| 5,440,326 A * | 8/1995 | Quinn | 345/156 |
| 5,506,605 A | 4/1996 | Paley | |
| 5,703,623 A | 12/1997 | Hall et al. | |
| 5,825,350 A | 10/1998 | Case, Jr. et al. | |
| 5,898,421 A | 4/1999 | Quinn | |
| 6,072,467 A | 6/2000 | Walker | |
| 6,178,375 B1 * | 1/2001 | Breunig | 701/124 |
| 6,249,274 B1 | 6/2001 | Svancarek et al. | |
| 6,347,290 B1 | 2/2002 | Bartlett | |
| 6,545,661 B1 | 4/2003 | Goschy et al. | |
| 6,597,443 B2 | 7/2003 | Boman et al. | |
| 6,721,738 B2 | 4/2004 | Verplaetse et al. | |
| 6,754,596 B2 | 6/2004 | Ashe et al. | |
| 6,847,351 B2 | 1/2005 | Noguera et al. | |
| 6,856,327 B2 | 2/2005 | Choi et al. | |
| 6,861,946 B2 | 3/2005 | Verplaetse et al. | |
| 7,205,979 B2 * | 4/2007 | Zimmerman et al. | 345/158 |
| 2004/0070564 A1 | 4/2004 | Dawson | |
| 2004/0095317 A1 | 5/2004 | Zhang et al. | |
| 2004/0217941 A1 | 11/2004 | Chen | |
| 2004/0222976 A1 | 11/2004 | Muresan et al. | |
| 2004/0227725 A1 | 11/2004 | Calarco et al. | |
| 2005/0052414 A1 | 3/2005 | Park et al. | |

OTHER PUBLICATIONS

Marcelo H. Ang, Jr. and Vassilios D. Tourassis, "Singularities of Euler and Roll-Pitch-Yaw Representations," IEEE Transactions on Aerospace and Electronic Systems, pp. 317-324, vol. AES-23, No. 3, May 1987.*
http://www.gyration.com/us/tech/technology.htm, 2004.
http://www.polhemus.com/PATRIOT.htm, 2004.
http://www.polhemus.com/fastrak.htm, 2004.
http://www.ascension-tech.com/products/motionstarwireless.php, 2005.

* cited by examiner

*Primary Examiner* — Chanh Nguyen
*Assistant Examiner* — Kwang-Su Yang

(57) ABSTRACT

A hand-held pointing device for manipulating an object on a display is disclosed. The device is constructed from at least one accelerometer and at least one linear input element. The accelerometer or accelerometers generate a pitch signal and a roll signal. These pitch and roll signals are used to determine a position on a display.

20 Claims, 4 Drawing Sheets

WIRELESS HAND-HELD ELECTRONIC DEVICE FOR MANIPULATING AN OBJECT ON A DISPLAY

This application claims priority based on U.S. Provisional Patent Application Ser. No. 60/624,335 entitled "3D Mouse/Pointer Based on Spherical Coordinates System and System for Use," filed Nov. 2, 2004.

This application is a continuation of U.S. patent application Ser. No. 11/263,710 filed Oct. 31, 2005 U.S. Pat. No. 7,683,883 entitled "3D Mouse and Game Controller Based on Spherical Coordinates System and System for Use" which has been allowed to issue.

FIELD OF INVENTION

The present invention relates to the field of computer peripherals and controllers. One embodiment of the present invention relates to the control of 3D video games characters, home entertainment systems or more industrial applications such as robotics and the control of UAVs (unmanned aerial vehicles) and UGVs (unmanned ground vehicles). Specifically, one embodiment of the present invention relates to a method and apparatus for moving and controlling a cursor, object, character or mechanical system in a virtual or physical 3D environment. One embodiment of the present invention uses inertial sensing technology and an approach based on a mathematical representation of the 3D space with spherical coordinates, instead of the Cartesian representation mostly used in 3D applications.

BACKGROUND OF THE INVENTION

The tremendous computing power available at low cost in the early $21^{st}$ century has made possible many computer applications that previously were unattainable because of the computational resources required. A prime example is three-dimensional modeling. To compute large three-dimensional models and to manipulate them in real-time requires large computational power, unless the models are very primitive. Today many applications, ranging from computer games with very high levels or realism to modeling of sub-surface geological formations are possible on even relatively mainstream computer systems.

A related trend is the merging of technologies such as televisions, home theatre, computers and game stations to produce PC Entertainment Centers. This trend is complemented by the drive towards 3D games and game environments. One challenge, however, is to make full use of the three dimensional environments by giving the users attractive tools to manipulate objects or characters of these three dimensional environments.

In the two-dimensional computing world, the mouse has become a ubiquitous feature for allowing a user to move a cursor around in the two-dimensional space. Moving the cursor with the mouse can be used to find and select particular objects. There is a need to be able to move a cursor to objects located in three-dimensional space as well as the need to move objects or characters in a 3D environment. This is much more challenging than moving a mouse across a tabletop as is the customary means for moving a cursor using a three-dimensional mouse.

In the prior art there are several known methods for moving a cursor in three-dimensional space. These include moving a receiver with respect to a field established by external beacons or emitters/receivers, with respect to acoustic, magnetic or optical signals that may be detected by the receiver. Problems with such approaches include the need for using external devices.

Other prior art solutions rely on gyroscopes to detect the movement of a 3D mouse, allowing the device to move a cursor in a 2D plan on the monitor. However, these solutions lack the 3D capability that is needed when dealing with 3D environments.

From the foregoing it is apparent that there is a hitherto unmet need for a 3D pointing/controlling device that is self-contained, lightweight, and which uses low-cost components. The need is also apparent for a controlling device that could be used to remotely control mechanical systems such as Unmanned Air Vehicles (UAVs), UGVs Unmanned Ground Vehicles (UGVs), Unmanned Water Vehicles (UWVs) and other robotics systems, in a natural and efficient manner that is different from the method still followed today as represented by the control unit of model airplanes and the likes. One embodiment of the present invention can be used to address needs such as these.

DESCRIPTION OF THE EMBODIMENTS

Figure 1:
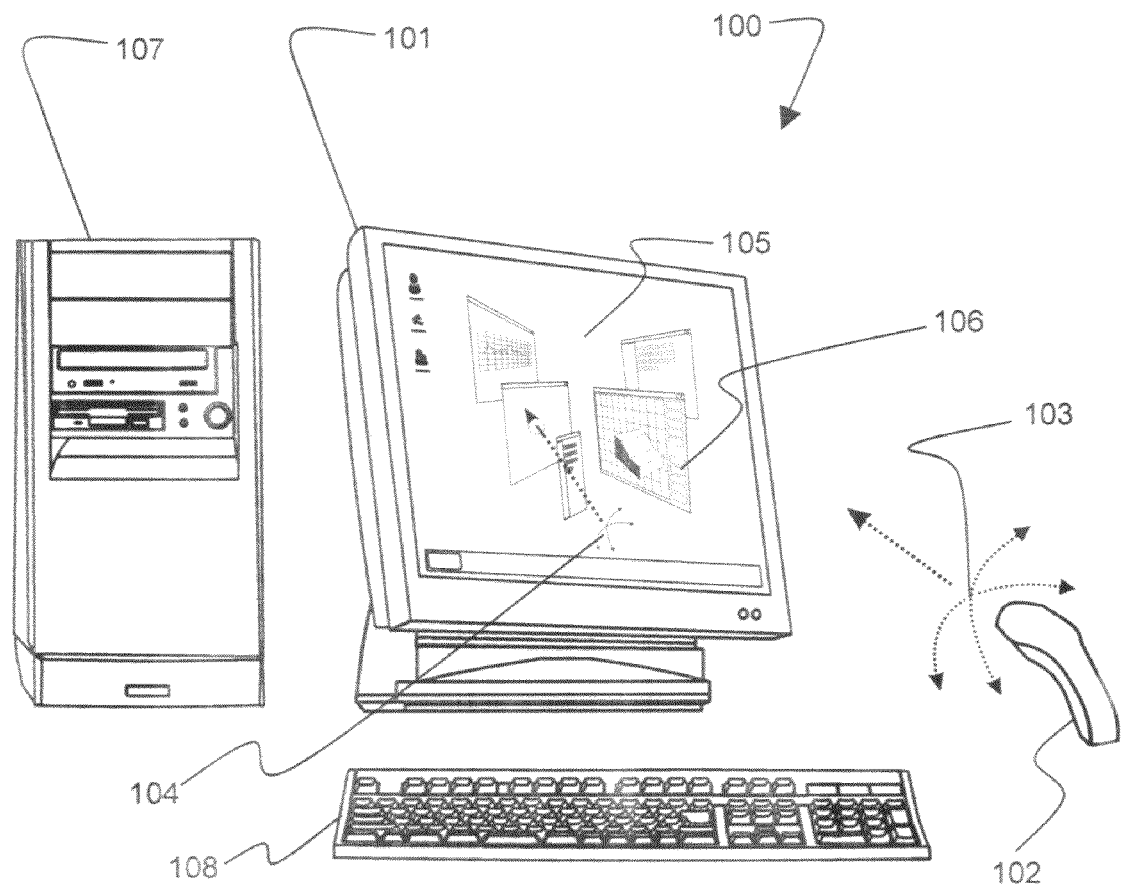
FIG. 1 shows a 3D input device used in a 3D computer system.

This invention is described in one embodiment in the following description with reference to the Figures, in which like numbers represent the same or similar elements or process steps. While this invention is described in terms of the best mode for achieving this invention's objectives in a particular application, it will be appreciated by those skilled in the art that variations may be accomplished in view of these teachings without deviating from the spirit or scope of the present invention.

For example, the present invention may be implemented using any combination of computer programming software, firmware, or hardware. As a preparatory step to practicing the invention or constructing an apparatus according to the invention, the computer programming code (whether software or firmware) according to the invention will typically be embedded in one or more machine readable storage devices such as micro-controllers, Flash memories, semiconductor memories such as ROMs, PROMs, etc., thereby making an article of manufacture in accordance with the invention.

The article of manufacture containing the computer programming code is used by either executing the code directly from the storage device, or by transmitting the code according to the present invention with appropriate standard computer hardware to execute the code contained therein. An apparatus for practicing the invention could be one or more devices having network access to computer program(s) coded in accordance with the invention.

One embodiment of the present technological innovation relates to pointing (I/O) devices used to position or manipulate a vectorial object. Vectorial objects can be vectorial cursors, graphical symbols, or any pictorial representation of physical or virtual object or character having one or multiple dimensions that has both a linear component (such as magnitude [or size], or position in a Cartesian space) and an angular component (such as orientation). In particular one embodiment of the present invention relates to handheld devices that can be used to position or manipulate a vectorial object such as a vectorial cursor or 3D objects/Characters in three-dimensional space. A vectorial cursor in 3D is the analog of a cursor in 2D. It is shaped like an arrow giving the user spatial feedback of the direction and position of the cursor. Depending on the application, the length of the arrow could be variable or fixed, whereby the arrow would be either extending from a spherical coordinates point of reference, or virtually moving in the 3D space. Thus, provided is an inertial sensor-based application related to a 3D Mouse that can act as a spatial pointer and can reach objects and icons in three dimensional environments and manipulate said objects, icons or characters. Such three dimensional environments could be generated by 3D graphical rendering or 3D GUIs with 2D monitors, volumetric monitors or stereoscopic and holographic monitors.

Such an embodiment of the present invention is based on inertial technology and methods that determine the position of a cursor in a 3D environment. This is achieved by mapping the movement of an operator's hand in space onto a polar coordinates frame of reference, thus optimizing the number of inertial sensors needed and reducing manufacturing cost. In such an embodiment, the application of the technology uses a single accelerometer in a form factor allowing it to be used as a desktop mouse or free-standing remote controller or game controller. In addition to its role as a mouse for the interaction with 3D environments and 3D GUIs, the device/technology has the capability—in one embodiment—to act as a universal remote controller with both 2D and 3D interfaces of entertainment/media centers.

In another embodiment the same approach could be used with a glove-like application allowing the user to interact with both 2D and 3D environments by limited movements of the hand and/or fingers. In a further embodiment, it could also act as an advanced game controller for 3D games and could be coupled with haptic feedback. Furthermore, the method/technology could be applied in combination with portable game consoles (Gameboy, PSP . . . ) allowing players to interact with mobile 3D games through movements of the console itself, in combination with triggers. This application is also useful with handheld computers and portable phones, allowing navigation through 2D or 3D interface menus by moving the device itself instead of using a stylus or the operators fingers.

Another embodiment of the technology would be as an add-on to game-specific sports hardware for a new generation of sports games (Baseball bat, Golf drive, Tennis racket, Skateboard, Skis, Luge . . . ) and body movement games. In yet another embodiment, the technology could be applied for the control of UAVs and other remote controlled aircrafts and/or their embedded systems such as cameras/other detection equipment. The same embodiment is applicable to the control of model toys (aircraft, cars, boats . . . ). A person familiar with the art would also find that the technology has also applications in the field of medicine, engineering and sciences. It could be a virtual scalpel, a controller for a robotic arm, or a pointer for the manipulation of 3D molecules among other applications . . . .

The present invention can provide a natural and ergonomic way to interact with 3D environments and to control systems in 3D space. This can be done by means of a 3-dimensional computer pointing and input device (3D Mouse/Controller) that uses a polar (spherical) coordinates approach implemented through the use of inertial technology (accelerometer), to reach a point in 3D space and to control graphical symbols and animated characters in 3D environments.

The present invention can be implemented using a 3D Pointer concept. The three-dimensional pointer is achieved by using a spherical coordinate system. Its structure permits the user to access any point in his virtual environment by properly changing the device's directions and by increasing or decreasing the pointer length. The tilt angles, Pitch and Roll, captured from the accelerometer are used respectively as Alpha and Beta angles of the spherical coordinate system as illustrated in the equations below. While directions are captured from the hand movement by measuring the projection of the static gravity on the tilted accelerometer, the pointer length which is the physical analog of the radius R is simulated by using a trigger pair on the device. The user can change its pointer in order to reach the desired three-dimensional point by pressing the increase and decrease triggers. An alternative is to use a time varying pointer length. As a result the instantaneous position of the pointer in the inertial frame can be expressed as a function of the time-varying radius and spherical angles.

$$X = R(t) \cdot \cos(\alpha) \cdot \sin(\beta)$$

$$Y = R(t) \cdot \sin(\alpha) \cdot \sin(\beta)$$

$$Z = R(t) \cdot \cos(\beta)$$

Like most 3D interfaces it is important to distinguish between the inertial frame and the user frames. The inertial frame is considered as a reference and all objects in the 3D virtual environment are expressed with respect to it. Thus this system is fixed. The x-axis is pointing to any convenient direction, the z-axis is pointing vertically upward and the y-axis is perpendicular to both. The user frame is the mobile system containing the pointer. It is defined by a rotation around the z-axis by $\psi$ and by the rotation around x and y by $\theta$ and $\Phi$. Moreover the distance between those frames defines the offset of the pointer with respect to the inertial frame. The figure below illustrates those rotations. The matrix linking between those two frames is the product of the following rotation matrix.

$$R = e^{(\hat{z}x)\psi} e^{(\hat{y}x)\theta} e^{(\hat{x}x)\varphi}$$

$$= \begin{bmatrix} \cos(\psi) & -\sin(\psi) & 0 \\ \sin(\psi) & \cos(\psi) & 0 \\ 0 & 0 & 1 \end{bmatrix} \cdot \begin{bmatrix} \cos(\theta) & 0 & \sin(\theta) \\ 0 & 1 & 0 \\ -\sin(\theta) & 0 & \cos(\theta) \end{bmatrix} \cdot \begin{bmatrix} 1 & 0 & 0 \\ 0 & \cos(\varphi) & -\sin(\varphi) \\ 0 & \sin(\varphi) & \cos(\varphi) \end{bmatrix}.$$

After developing we get:

$$R_{IB} = \begin{bmatrix} \cos(\psi)\cdot\cos(\theta) & \cos(\psi)\cdot\sin(\theta)\cdot\sin(\varphi)-\sin(\psi)\cdot\cos(\varphi) & \cos(\psi)\cdot\sin(\theta)\cdot\cos(\varphi)-\sin(\psi)\cdot\sin(\varphi) \\ \sin(\psi)\cdot\cos(\theta) & \sin(\psi)\cdot\sin(\theta)\cdot\sin(\varphi)-\cos(\psi)\cdot\cos(\varphi) & \sin(\psi)\cdot\sin(\theta)\cdot\cos(\varphi)-\cos(\psi)\cdot\sin(\varphi) \\ -\sin(\theta) & \cos(\theta)\cdot\sin(\varphi) & \cos(\theta)\cdot\cos(\varphi) \end{bmatrix}$$

In one embodiment of the present invention the 3D interface is used to create the virtual reality scene needed to interact with the 3D pointer. This interface is developed in an expandable mode in order to permit any improvement in the future. This interface allows the user to interact with the 3D objects, to change the colors of the ground and the pointer, to change the render mode between wire frame, hidden, and rendered, to change the view angles and the light intensity.

It is important to mention that the yaw angle can be changed directly from the pointing device in order to make the navigation easier. In order to avoid the use of additional sensing components such as a magnetic sensor or Gyroscope, we have simulated the yaw dimension by a rotation of the field of view. This field of view rotation is a manipulation of the graphical perspective through the interface software, by a pair of control buttons on the device itself.

In one embodiment of the present invention we are using an inertial sensor to detect tilt accelerations that will then be converted into movement. In this particular embodiment, we are using a MEMS accelerometer developed by Analog Devices, the ADXL202E MEMS accelerometer. Any similar inertial sensor including thermal accelerometers could be used. The ADXL202E is a low-cost, low-power, complete two-axis accelerometer with a digital output, all on a single monolithic IC. The ADXL202E can measure both dynamic acceleration (e.g., vibration) and static acceleration (e.g., gravity). The outputs are analog voltage or digital signals whose duty cycles (ratio of pulse width to period) are proportional to acceleration. A microprocessor counter, without an A/D converter or glue logic, can directly measure the duty cycle outputs. The duty cycle period is adjustable from 0.5 ms to 10 ms via external timing resistor.

The ADXL202E is a complete, dual-axis acceleration measurement system. For each axis, an output circuit converts the analog signal to a duty cycle modulated (DCM) digital signal that can be decoded with the timer port of the microprocessor used. The ADXL202E is capable of measuring both positive and negative accelerations to at least ±2 g. The accelerometer can measure static acceleration forces such as gravity, allowing it to be used as a tilt sensor as used in our application. Acceleration will result in an output square wave whose amplitude is proportional to acceleration. Phase sensitive demodulation techniques are then used to rectify the signal and determine the direction of the acceleration.

One of the most popular applications of the ADXL202E is tilt measurement. An accelerometer uses the force of gravity as an input vector to determine orientation of an object in space. An accelerometer is most sensitive to tilt when its sensitive axis is perpendicular to the force of gravity, i.e., parallel to the earth's surface. At this orientation its sensitivity to changes in tilt is highest. When the accelerometer is oriented on axis to gravity, i.e., near its +1 g or −1 g reading, the change in output acceleration per degree of tilt is negligible. When the accelerometer is perpendicular to gravity, its output will change nearly 17.5 mg per degree of tilt, but at 45° degrees it is changing only at 12.2 mg per degree and resolution declines. Due to the fact that it is sensible to the static gravity, it can be used to measure especially Tilt angles (Pitch and Roll) just by measuring the projection of the vector g over each axis of the accelerometer.

When the accelerometer is oriented so both its X and Y axes are parallel to the earth's surface it can be used as a two axis tilt sensor with a roll and a pitch axis. Once the output signal from the accelerometer has been converted to an acceleration that varies between −1 g and +1 g, the output tilt in degrees is calculated as follows:

$$\text{Pitch} = A\text{Sin}\left(\frac{Ax}{1g}\right)$$

$$\text{Roll} = A\text{Sin}\left(\frac{Ay}{1g}\right)$$

In one embodiment of the present invention the 3D Mouse/controller is a hand held device that captures the movement of a hand in free space and controls the movement of a vectorial cursor, object or character in an application on a monitor, or a system in physical space. It uses inertial technology in the form of an accelerometer or any similar technology that measures angular acceleration/displacement with great precision. This technology allows the 3D Mouse/Controller to be self-contained without the need for beacons or emitters/receivers to detect generated signals, as the case would be with acoustic, magnetic or optical approaches.

Practically, it could be either used as a mouse for 3D GUIs and volumetric monitors, a controller for 3D games, a pointer for interactive presentations or as a remote controlling device for the upcoming PC Entertainment Centers that would combine a TV with a Computer and a Home Theatre. Its range only depending of that of the wireless technology used. In an alternative embodiment, the 3D Mouse/Controller is a wired device connected electrically to a computing device.

This control functionality could be extended to controlling more household peripherals such as telecommunications, lighting, irrigation, security system, heating/cooling or even car start-up in the morning. This would be done through a software user interface (Windows, Linux etc. . . . ) that would appear on a large Plasma (or other) screen. The said screen playing the role of a TV, computer monitor and command and control interface.

In this respect, the 3D Mouse/Controller could be the future universal remote controller for the next generation of consumer appliances that would be controlled through a central computer (network of computers), instead of each having its own micro-controller and remote controlling device. The complexity of remote controllers would then be in the software interface that would be made more intuitive (and ideally in 3D) than the scroll down menu interface and large number of buttons currently available.

As the 3D Mouse/Controller also has a spatial capability with the needed degrees of freedom, it is a suitable device for the new generation of 3D monitors (e.g., Stereographic, Holographic and Volumetric). There is a number of companies developing such monitor technologies in the US, Europe and Asia and their feedback is that they still lack a practical/ affordable 3D Mouse/Controller that would allow operators to navigate easily in the 3D environment.

The 3D capability is achieved through a limited amount of hand movements (rotations) that would allow the alignment of a feedback vector (vectorial cursor) with the object to be reached, on the monitor. Practically, the alignment is done by varying the vertical and horizontal angles of the ray, in a polar frame of reference. Once the alignment is achieved, the 3D Mouse allows the extension of the ray whereby it would reach the object, thus enabling it for further manipulation. This approach allows an optimization of needed electronics whereby only one inertial device (accelerometer) is needed for the basic 3D functionality.

The 3D capability of the device would also enable a new generation of Virtual reality applications (in this case a haptic feedback might be added), Industrial and military simulations, advanced 3D CAD/CAM design, Medicine, Molecular Chemistry, Bio-informatics . . . .

This 3D capability is also an enabling factor for the next generation of game stations and game environments. A game controller enabled by this 3D technology will be able to control characters in a 3D space with very natural movements.

In one particular embodiment, the technology could be embedded in a portable/mobile game device/system (similar to Gameboy, PSP . . . ) adding 3D capability and control through hand movements and allowing the advent of 3D games controlled through movements of the game system itself, thus starting a paradigm shift in portable game systems.

In another embodiment, the technology could be embedded in game controllers with the shape of sports equipment, (non-extensive list including Golf clubs, Tennis racquets or Baseball bats), thus allowing the creation of even more realistic video games around sports themes.

Other applications would be a remote controller for hobbyists or for military personnel tele-guiding flying entities such as Unmanned Air Vehicles (UAVs), Unmanned Ground Vehicles (UGVs), or Unmanned Water Vehicles (UWV)s.

From a marketing perspective, the field seems ripe for the technology, especially that it has been designed to be manufactured cost-effectively. One embodiment of the present invention relies on Bluetooth wireless communications and RS 232 connectivity. It is also possible to have wired USB connectivity and Wi-Fi (wireless) communications or any other enabling technology capable of being understood by anyone skilled.

FIG. 1 shows a 3D computer system at 100. Referring to FIG. 1, a computer is shown at 107, a computer monitor is shown 101, and a computer keyboard is shown at 108. A 3D environment 105 and a set of 3D applications 106 are shown within the monitor 101. A 3D input device or Mouse/Controller 102 interacts with the 3D environment 105 by controlling a vectorial cursor 104. In the example shown here, the vectorial cursor 104 is shaped like an arrow giving the user spatial feedback of the direction and position of the cursor. Depending on the application, the length of the arrow could be extensible or fixed. In the embodiment shown here, the base of the arrow is a fixed origin of a spherical coordinate system and changes in the length of the vectorial cursor 106 are controlled through a linear input element comprising a pair of buttons on the input device 102, allowing a user to reach any point in the space depicted on the monitor 101. In an alternate embodiment, the location of the base of the arrow can be controlled through the input device allowing the entire arrow, or vectorial cursor 104 to move virtually in the 3D space, with the length of the arrow being either fixed or responsive to user input through the 3D input device. A linear input element used in such an input device 102 can be any single or multiple user-responsive components understood by anyone skilled in the art. Examples of linear input elements include a pair of push buttons, a slide switch, a touch pad, and a scroll wheel.

It should be noted that a computer system could be any system that includes an information-processing unit. Examples of computer systems include, but are not limited to personal digital assistants (PDAs), personal computers, minicomputers, mainframe computers, electronic games, and microprocessor-based systems used to control personal, industrial or medical vehicles and appliances.

The movement and control functions of the 3D Mouse/Controller 102 are shown as phantom lines at 103. The curved lines and arrows at 103 represent possible movements of the device held by the user. An upward or downward tilt (pitch) of the device would move the vectorial cursor 104 in a similar fashion on the screen, while a lateral tilt (roll) in a left-right manner would move the vectorial cursor 104 on the screen to the left or right. The magnitude of the vectorial cursor 104 is controlled using a pair of control triggers on the device. The combination of pitch, roll, and vector magnitude allow the user to reach any point in 3D space using spherical coordinates with a minimal amount of physical movement.

In one embodiment illustrated in FIG. 1, the 3D Mouse/Controller 102 is pointing at 3D applications 106 in 3D graphical user interface (GUI) 105 that are displayed on a monitor 101. In another embodiment, the 3D Mouse/Controller 102 could control one or more 3D graphical objects in a 3D games environment in the same manner. A graphical object can be a video game character or any other graphical symbol in a 3D environment. In that case, the physical embodiment of the controlling device 102 could look like a game controller and the 3D character would be substituted for the vectorial cursor 103. The vector magnitude derived from a linear input element in the Mouse/Controller 102 can be used to control the size or orientation of the graphical object.

In another embodiment, the Mouse/Controller 102 is a 2D input device working in radial coordinates. In this case, only one tilt angle and a minimum of one linear input are measured in the input device 102 to provide a 2D navigational device operating in radial coordinates. In yet another embodiment, the Mouse/Controller 102 is an input device with two linear input elements capable of changing a vector magnitude in perpendicular axes. These two perpendicular axis in conjunction with one tilt axis can generate a position in 3D space using cylindrical coordinates.

Figure 2B:
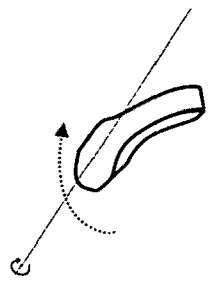
FIG. 2 shows the detailed movement of the device and the related control of a vectorial cursor.
Figure 2B:
Figure 2B:
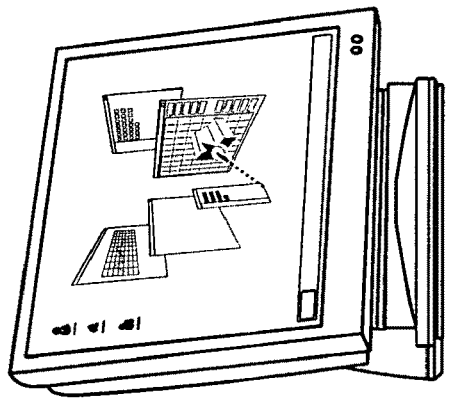
Figure 2D:
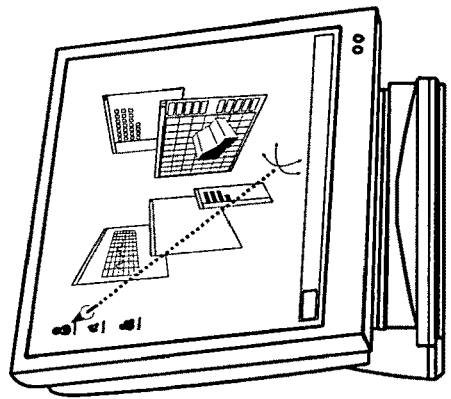
Figure 2A:
Figure 2A:
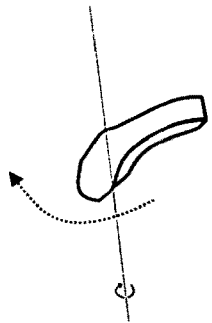
Figure 2A:
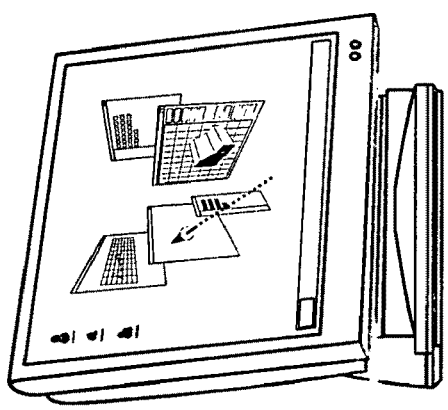
Figure 2C:
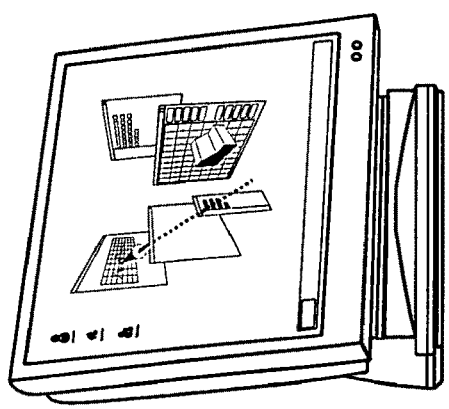

FIGS. 2a, 2b, 2c, and 2d show the detailed movement of the 3D Mouse/Controller 102 and the related control of the vectorial cursor 104. FIG. 2a shows the initial state of the device 102 and vectorial cursor 104 pointing on one application 106. FIG. 2b shows a right rolling tilt of the device 102 that causes the vectorial cursor 104 to move right and point to another application 106 to the right of the initial one in FIG. 2a. FIG. 2c shows an upward tilt of the device 102 that causes the vectorial cursor 104 to move up and point to another application 106 above of the initial one in FIG. 2b. FIG. 2d shows the extension function through a button on the device 102 that causes the vectorial cursor 104 to move further inside the 3D GUI 105 and point to an icon on the desktop 106 above of the application one in FIG. 2c.

FIGS. 2a, 2b, 2c are the actual rendering of the device movements and vectorial cursor control as described in FIG. 1. Namely, an up-down tilt of the device will move the cursor in an upward or downward manner. Similarly, a left-right tilt of the device would move the vectorial cursor to the left or the right. Finally, the vectorial cursor would move forward or backward through the depression of a pair of triggers on the device itself that controls its spatial extension and retraction.

Figure 3:
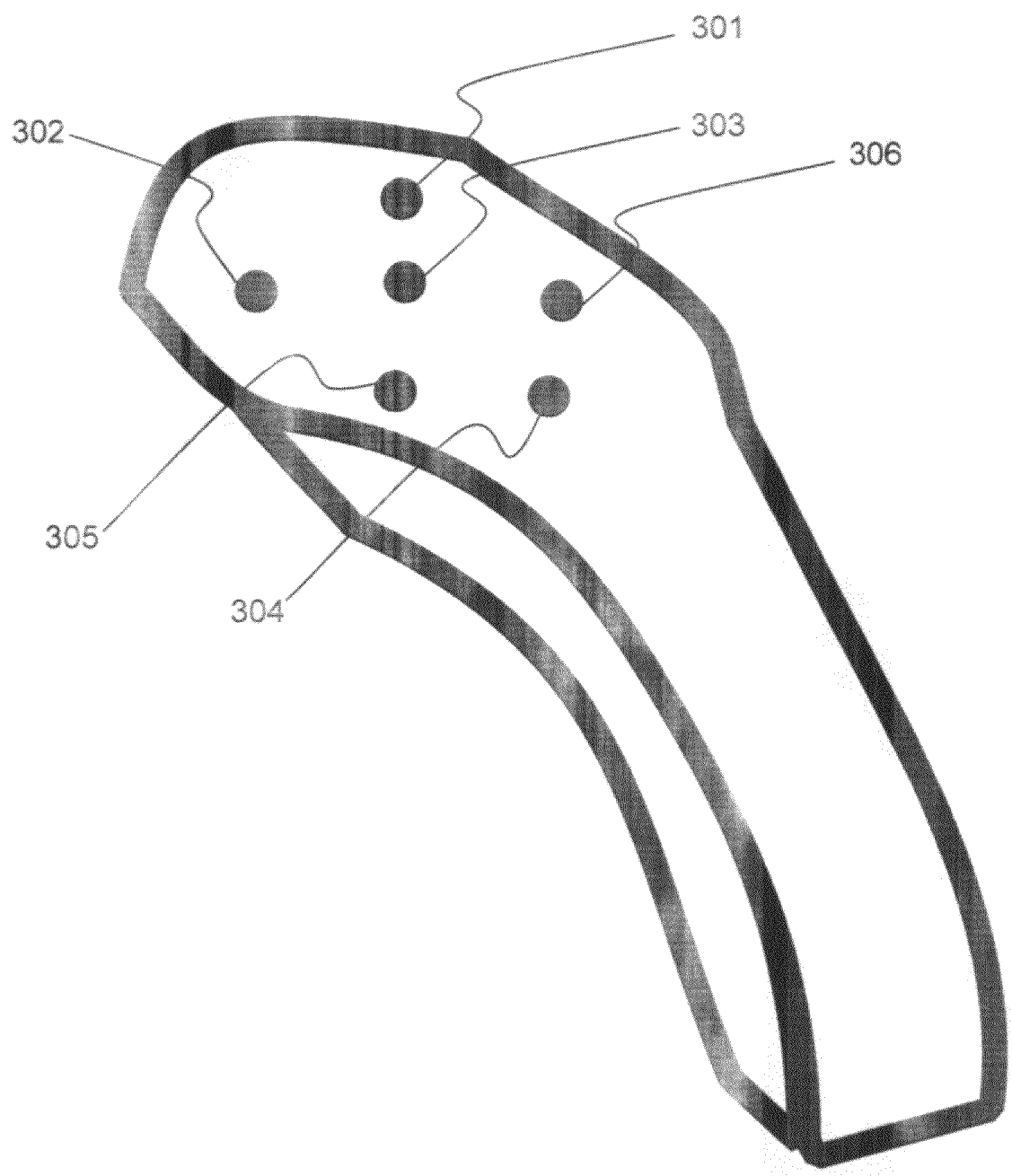
FIG. 3 shows one embodiment of the 3D Mouse/Controller with the knobs and buttons used for interaction with a 3D environment.

FIG. 3 shows one physical embodiment of the 3D Mouse/Controller with the knobs and buttons used for interaction with a 3D environment. One pair of buttons 301/302 is the equivalent of the left and right clicks of a regular mouse. They activate similar functions. A second pair of buttons (triggers) 303/304 enables the extension and retraction of the vectorial cursor to reach different parts of a 3D environment, by increasing the module of the vectorial cursor. The vectorial cursor being the physical analog of a spherical vector, the buttons actually increase/decrease the module of the vector which is rendered on the screen by a movement of the vectorial cursor forward or backward.

A third pair of buttons 305/306 allows the user to change the field of view or "perspective" of a 3D scene, in order to simulate the Yaw dimension. This is done by graphically changing the field of view through a graphical transformation in the interface software. The action is controlled by another pair of triggers on the device.

Figure 4:
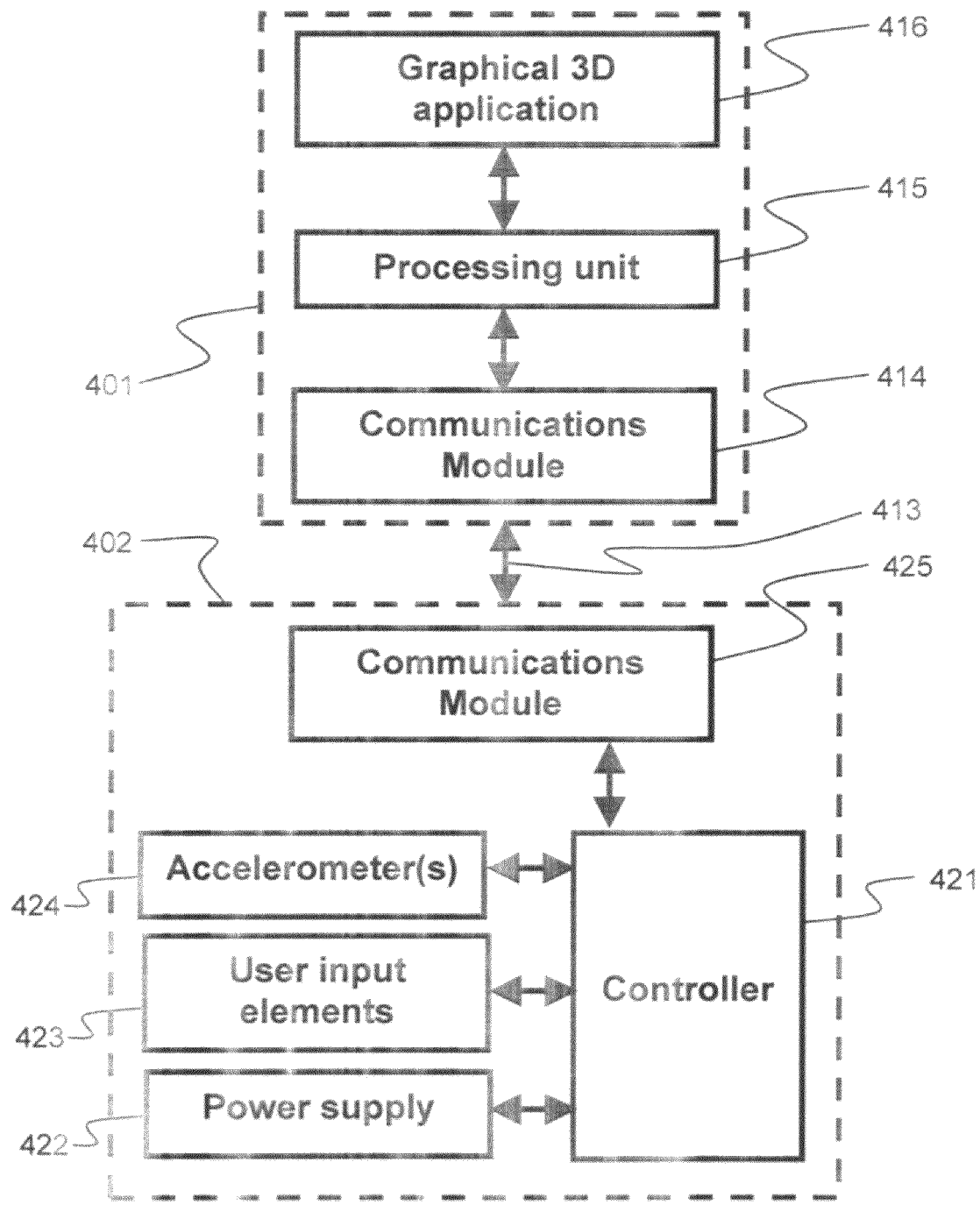
FIG. 4 shows a block diagram of the 3D Mouse/Controller system and the way it interacts with a 3D application on the computer monitor, through interrelated modules performing the different functions of: Movement Sensing, Sensing data interpretation and conversion to digital data, Wireless Communication of the data to an interface, Graphical rendering of the data in a 3D application.

FIG. 4 shows a block diagram of one embodiment of the 3D Mouse/Controller system. The system comprises an input device (which can also be a hand-held pointing device or a 3D Mouse/Controller) 402 and a display control unit module 401. The input device includes an inertial sensor (accelerometer) 424 operable to detect an acceleration as the user tilts the pointing device in at least one direction; a power supply 422 (which can be a battery, AC power supply, solar cell or any other source of electrical power understood by anyone skilled in the art), a selection unit 423 that comprises a set of user input elements and circuitry to collect the elements activity and allow the user to:

select a command identifier on the display the same way a user would do with the right and left click buttons of a 2D mouse;

control the vectorial cursor location through a pair of triggers that extends the magnitude of the spherical radius R which is the mathematical representation of the vectorial cursor; and control the field of view of a 3D application.

In one embodiment, the hand-held pointing device 402 also includes a controller 421 based around a microcontroller and digital signal processor, a field programmable gate array, programmable logic devices, and other related control circuitry well understood by anyone skilled in the art. The controller 421 is connected to the accelerometer 424, the selection unit 423 and the power supply 422. The controller 421 is programmed to receive accelerometer data and to compute tilt angles based on the accelerometer data. The controller 421 is also programmed to receive trigger signals from the selection unit and to compute a vector magnitude and field of view translation in response to the trigger signals. The circuit also manages the battery or other power source 422 and optimizes power consumption for the system. In one embodiment, the hand held pointing device further includes a communications module 425 that converts computed data into communication protocols to be dispatched to a host computer via a wireless (or wired) connection 413;

Further referring to FIG. 4, the display unit control module 401 in one embodiment of the present invention includes a communications module 414 to receive the orientation data and user selection activity data transmitted from the handheld pointing device; and a processing unit 415 comprising a microprocessor, a digital signal processor, memory modules and a driver that interprets communicated data to be viewed by a software interface (graphical 3D application) 416; wherein the software interface gives a graphical rendering of dispatched and interpreted data.

Thus, a method and apparatus for interacting with virtual and physical 3D environment by means of a novel 3D Mouse/Controller is disclosed. These specific arrangements and methods described herein are merely illustrative of the principals of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

What is claimed is:

1. A wireless hand-held pointing device for manipulating an object on a display, the pointing device comprising:

an accelerometer responsive to tilt of the pointing device in a plurality of axes wherein:

the tilt signals are measured as a response of the projection of static gravity on the tilted accelerometer;

accelerometer tilt signal generation does not rely on a detector selected from the group consisting of a gyroscope, an acoustic detector, a magnetic detector, and an optical detector to generate a movement signal;

the accelerometer is most sensitive to tilt when the accelerometer is perpendicular to gravity; and the tilt signal comprises a pitch signal and a roll signal where pitch and roll are rotations about two perpendicular axes orthogonal to the gravitational vector;

a linear input element that generates an electrical signal responsive to user input, wherein the linear input element does not use a detector selected from the group of an acoustic detector, a magnetic detector, and an optical detector to generate the electrical signal and the linear input element generates the electrical signal of a magnitude controlled by the user;

an electronic circuit connected to the accelerometer and connected to the linear input element wherein the circuit:

comprises a control unit, a memory unit, a communications unit, and a battery, wherein the control unit further comprises a micro-controller, a digital signal processor, and a machine readable storage device;

calculates the pitch and the roll from the accelerometer tilt signal without using input from a device selected from the group consisting of a gyroscope, an acoustic detector, a magnetic detector, and an optical detector;

calculates pitch and roll according to the following equations:

$$\text{Pitch} = \text{ArcSin}\left(\frac{Ax}{1g}\right)$$

$$\text{Roll} = \text{ArcSin}\left(\frac{Ay}{1g}\right)$$

wherein Ax is the acceleration in an arbitrary direction parallel to the earth's surface, Ay is the acceleration in a second direction parallel to the earth's surface that is perpendicular to the direction defined by Ax, and g is gravity;

receives the electrical signal from the linear input element to determine a vector magnitude; and expresses the instantaneous position of the object in an inertial reference frame in Cartesian coordinates as a function of the vector magnitude and pitch and roll by using at least two of the following three equations:

$$X = R(t) \cdot \text{Cos}(\alpha) \cdot \text{Sin}(\beta)$$

$$Y = R(t) \cdot \text{Sin}(\alpha) \cdot \text{Sin}(\beta)$$

$$Z = R(t) \cdot \text{Cos}(\beta)$$

wherein X, Y, and Z represent a location in a Cartesian coordinate domain presented on the display wherein X, Y and Z also have the same origin as a spherical coordinate domain defined by the vector magnitude R(t) responsive to the electrical signal, is an angle representing the longitudinal relationship between R(t) and the ZX plane in the Cartesian coordinates that is responsive to pitch, and β is an angle representing the colatitudinal relationship between R(t) and the Z axis that is responsive to pitch and;

a communications module electrically coupled to the electronic circuit which generates a wireless signal responsive to pitch, roll and linear input wherein:

the wireless signal is transmitted electronically to a receiving element connected to the display using an industry standard protocol; and the wireless signal is a serial data transmission signal; and the wireless signal can be used by circuitry coupled to the display to manipulate the object on the display.

2. The wireless hand-held pointing device of claim 1, wherein said device is responsive to human body movement.

3. The wireless hand-held pointing device of claim 1, wherein the linear input element is responsive to movement of a user's finger.

4. The wireless hand-held pointing device of claim 1, wherein the linear input element comprises an inertial sensor.

5. The wireless hand-held pointing device of claim 1, wherein the device is provides a signal that changes the size of an object on the display.

6. The wireless hand-held pointing device of claim 1, wherein said device is monolithic.

7. The wireless hand-held pointing device of claim 1, wherein said device is comprised of individual detachable elements that communicate with each other.

8. The wireless hand-held pointing device of claim 1, wherein said device selects a command identifier on said display.

9. The wireless hand-held pointing device of claim 1, wherein the electronic circuit generates a yaw dimension signal on the device using a mathematical transformation to graphically simulate a rotation of the field of view without the use of a module selected from the group consisting of a gyroscope and a magnetometer.

10. The wireless hand-held pointing device of claim 1, wherein the electronic circuit generates a yaw dimension signal by using a gyroscope.

11. A wireless device for manipulating a graphical object in Cartesian space on a two-dimensional display, the device comprising:

an accelerometer responsive to tilt of the device in a plurality of axes wherein:

the tilt signals are measured as a response of the projection of static gravity on the tilted accelerometer;

tilt signal generation does not rely on a detector selected from the group consisting of a gyroscope, an acoustic detector, a magnetic detector, and an optical detector to generate a movement signal;

the accelerometer is most sensitive to tilt when the accelerometer is perpendicular to gravity; and the tilt signal comprises a pitch signal and a roll signal where pitch and roll are rotations about two perpendicular axes orthogonal to the gravitational vector;

a linear input element that generates an electrical signal responsive to user input, wherein the linear input element does not use a detector selected from the group of an acoustic detector, a magnetic detector, and an optical detector to generate the electrical signal and the linear input element generates the electrical signal of a magnitude controlled by a user;

an electronic circuit connected to the accelerometer and connected to the linear input element wherein the circuit:

comprises a control unit, a memory unit, a communications unit, and a battery, wherein the control unit further comprises a micro-controller and a machine readable storage device;

calculates the pitch and the roll from the tilt signal without using input from a device selected from the group consisting of a gyroscope, an acoustic detector, a magnetic detector, and an optical detector;

calculates pitch and roll according to the following equations:

$$\text{Pitch} = \text{ArcSin}\left(\frac{Ax}{1g}\right)$$

$$\text{Roll} = \text{ArcSin}\left(\frac{Ay}{1g}\right)$$

wherein Ax is the acceleration in an arbitrary direction parallel to the earth's surface, Ay is the acceleration in a second direction parallel to the earth's surface that is perpendicular to the direction defined by Ax, and g is gravity;

receives the electrical signal from the linear input element to determine a variable radial distance; and expresses the instantaneous position of the object in an inertial reference frame in Cartesian coordinates as a function of the radius and spherical angles by using at least two of the following equations:

$$X = R(t) \cdot \text{Cos}(\alpha) \cdot \text{Sin}(\beta)$$

$$Y = R(t) \cdot \text{Sin}(\alpha) \cdot \text{Sin}(\beta)$$

$$Z = R(t) \cdot \text{Cos}(\beta)$$

wherein X, Y, and Z represent a location in a Cartesian coordinate domain having the same origin as a spherical coordinate domain defined by the variable radial distance R(t) responsive to the electrical signal, α is an angle representing the longitudinal relationship between R(t) and the ZX plane in the Cartesian coordinates, and α is an angle representing the colatitudinal relationship between R(t) and the Z axis, wherein the α angle is responsive to roll and β angle is responsive to pitch; and a communications module electrically coupled to the electronic circuit which generates a wireless signal responsive to pitch, roll, and linear input wherein:

the wireless signal is transmitted electronically to a receiving element connected to the display using an industry standard protocol; and the wireless signal is a serial data transmission signal; and the wireless signal can be used by circuitry coupled to the display to manipulate the graphical object on the display.

12. The wireless device of claim 11, wherein said display is part of said device.

13. The wireless device of claim 11, wherein said display is a television.

14. The wireless device of claim 11, wherein the accelerometer is responsive to tilt about more than one axis and wherein the accelerometer is constructed of more than one tilt sensor.

15. The wireless device of claim 11, wherein the accelerometer is responsive to tilt about more than one axis and wherein the accelerometer is constructed from one tilt sensor.

16. The wireless device of claim 11, wherein the pointing device is hand held.

17. A method for presenting user manipulation of a portable device onto a display, the method comprising the steps of:

establishing a portable device;

establishing an accelerometer in the portable device that generates a tilt signal responsive to a gravitational vector in the device;

measuring pitch and roll about two perpendicular axes orthogonal to the gravitational vector in response to the projection of static gravity on the tilted accelerometer without using a detector selected from the group consisting of a gyroscope, an acoustic detector, a magnetic detector, and an optical detector;

establishing an additional input element that generates a signal in response to user input;

using the additional input elements to generate an electrical signal of a magnitude controlled by the user and proportional to the user's input action;

establishing an electronic circuit that comprises a control unit, a memory unit, and a communications unit, and an electrical storage device, wherein the control unit further comprises a micro-controller;

connecting the circuit to the accelerometer;

connecting the circuit to the additional input elements;

using the circuit to calculate pitch and roll from the tilt signals without using input from a device selected from the group consisting of a gyroscope, an acoustic detector, a magnetic detector, and an optical detector;

calculating pitch and roll according to the following equations:

$$\text{Pitch} = \text{ArcSin}\left(\frac{Ax}{1g}\right)$$

$$\text{Roll} = \text{ArcSin}\left(\frac{Ay}{1g}\right)$$

wherein Ax is the acceleration in an arbitrary direction parallel to the earth's surface, Ay is the acceleration in a second direction parallel to the earth's surface that is perpendicular to the direction defined by Ax, and g is gravity;

determining a variable linear distance in response to a signal from the additional input elements;

establishing a display that shows objects in a minimum of two dimensions;

using Cartesian coordinates to determine the location of a graphical object on the display by using the generated tilt information and signal from input element;

determining the instantaneous position of the graphical object on the display by using a minimum of two of the following equations:

$$X = R(t) \cdot \text{Cos}(\alpha) \cdot \text{Sin}(\beta)$$

$$Y = R(t) \cdot \text{Sin}(\alpha) \cdot \text{Sin}(\beta)$$

$$Z = R(t) \cdot \text{Cos}(\beta)$$

wherein X, Y, and Z represent a location in a Cartesian coordinate domain having the same origin as a spherical coordinate domain defined by the variable linear distance R(t), an α angle representing the longitudinal relationship between R(t) and the ZX plane in the Cartesian coordinates, and a β angle representing the colatitudinal relationship between R(t) and the Z axis, wherein the α angle is responsive to roll and β angle is responsive to pitch.

18. The method of claim 17, wherein establishing a portable device further comprises establishing a wireless portable device.

19. The method of claim 17, wherein the display is attached to the portable device.

20. The method of claim 17, wherein the display is physically detached from the portable device and communication between the portable device and the display comprises a wireless protocol.

* * * * *